United States Patent [19]

Tanaka et al.

[11] Patent Number: 5,539,678
[45] Date of Patent: Jul. 23, 1996

[54] COORDINATE INPUT APPARATUS AND METHOD

[75] Inventors: Atsushi Tanaka, Kawasaki; Yuichiro Yoshimura, Kamakura; Ryozo Yanagisawa, Inzai-machi; Katsuyuki Kobayashi, Yokohama; Masaki Tokioka, Fujisawa; Hajime Sato, Yokohama, all of Japan

[73] Assignee: Canon Kabushiki Kaisha, Tokyo, Japan

[21] Appl. No.: 237,889

[22] Filed: May 4, 1994

[30] Foreign Application Priority Data

May 7, 1993 [JP] Japan .................................. 5-106640

[51] Int. Cl.⁶ ................................................. G01B 7/004
[52] U.S. Cl. .......................... 364/561; 364/560; 364/562
[58] Field of Search ................................. 364/561, 559, 364/560, 562, 563, 454, 413.19, 421, 474.37; 395/161, 105, 103, 119; 33/503–505, 700, 701, 706, 713–717, 362; 367/7–9, 10, 11, 21, 22, 27, 117, 127, 907; 73/584, 624, 628, 640, 641, 649, 602, 603, 609, 618, 620, 654, 662, 663, 505; 345/177, 158, 10, 178, 173; 178/18, 19

[56] References Cited

U.S. PATENT DOCUMENTS

| | | | |
|---|---|---|---|
| 4,931,965 | 6/1990 | Kaneko et al. | 364/560 |
| 5,253,187 | 10/1993 | Kaneko et al. | 367/907 |
| 5,334,805 | 8/1994 | Knowles et al. | 367/907 |
| 5,352,856 | 10/1994 | Tanaka et al. | 367/907 |

FOREIGN PATENT DOCUMENTS

| | | |
|---|---|---|
| 0207527 | 1/1987 | European Pat. Off. . |
| 0333219 | 9/1989 | European Pat. Off. . |
| 0530836 | 3/1993 | European Pat. Off. . |

*Primary Examiner*—Emanuel T. Voeltz
*Assistant Examiner*—Hal D. Wachsman
*Attorney, Agent, or Firm*—Fitzpatrick, Cella, Harper & Scinto

[57] ABSTRACT

When vibration is entered on a vibration transmitting tablet, the vibration is sensed by vibration sensors attached at four corners of the tablet. When this is done, a time delay from entry of the vibration to detection thereof is measured, and the distance between each sensor and the source of the vibration is calculated in dependence upon the time delay. At this time the vibration sensors also sense reflected waves resulting from reflection of the vibration at the end face of the tablet. The larger the angle of reflection, the greater the magnitude of the reflected waves sensed. Accordingly, sensors most likely to sense reflected waves are excluded from calculation, and coordinates are calculated based upon vibration sensed by the remaining sensors only. As a consequence, a discontinuity in coordinates occurs at the boundary of a region decided by whichever of the sensors are excluded. For this reason, a weighted mean is computed of a set of coordinates calculated based upon data obtained from a set of a plurality of sensors, and the value of the weighted mean is adopted as the coordinates sought.

6 Claims, 9 Drawing Sheets

COORDINATE INPUT APPARATUS AND METHOD

BACKGROUND OF THE INVENTION

1. Field of the Invention

This invention relates to a coordinate input apparatus and, more particularly, to a coordinate input apparatus in which elastic-wave vibration that has been entered from a vibrating pen is sensed by a plurality of vibration sensors provided on a vibration transmitting tablet, and the coordinates of a point at which vibration is entered by the vibrating pen is sensed based upon a time delay in the elastic-wave input to the vibration transmitting tablet from the vibrating pen.

2. Description of the Related Art

Ordinarily, in an apparatus of this type, the time delays required for the vibration generated by the vibrating pen to reach vibration sensors provided at prescribed positions of the vibration transmitting tablet are measured, and the distances from the vibrating pen to the vibration sensors and, hence, the coordinates designated by the vibrating pen, are calculated based upon the measured values.

Vibration detected by a vibration sensor contains, in addition to a direct-wave component that reaches the vibration sensor directly upon being generated by the vibrating pen, a reflected-wave component that reaches the vibration sensor upon being reflected at, say, the end face of the vibration transmitting tablet. Components other than the direct-wave component needed for coordinate calculation are unnecessary components and result in erroneous calculation of coordinates. For this reason, it is required that the effects of the unnecessary reflected-wave component be reduced. In order to suppress the level of reflected waves, an expedient used in the art is to attenuate the reflected waves by affixing a vibration suppressor in the proximity of the end face of the vibration transmitting tablet. Despite this arrangement, however, there are cases in which the effects of reflected waves appear when the external configuration of the coordinate input unit is made small in size. Specifically, when the apparatus is made compact, the effective area of the apparatus approaches the vibration suppressor. Consequently, when vibration generated by the vibrating pen is reflected at the boundary of the vibration suppressor and the resulting reflected waves arrive at a vibration sensor, these reflected waves exhibit a large angle of incidence with respect to the vibration suppressor. When the angle of incidence approaches 90°, the reflectivity at the boundary where the vibration suppressor is affixed approaches 1. Accordingly, there are instances where the level of the reflected waves is enlarged, as a result of which coordinates are sensed erroneously owing to the effects of the reflected waves.

The greater the distance from the point designated by the vibrating pen to the particular sensor, and the closer this point is to the vibration suppressor within the confines of the effective area, the greater the angle of incidence. In such cases the aforementioned problem becomes more pronounced.

In order to solve this problem, an arrangement has been provided in which the region of a pen-designated position in an effective area for coordinate designation is discriminated based upon a delay time necessary for elastic-wave to reach a vibration sensor from a vibration input pen by which the vibration has been applied to a vibration transmitting tablet, and coordinate calculation is performed, on the basis of the discriminated region, without using sensors readily susceptible to the effects of reflected waves because of a large angle of incidence of the reflected waves with respect to the vibration suppressor, wherein these waves reach vibration sensors owing to reflection at the boundary with the vibration suppressor.

FIG. 7 is a diagram for describing coordinate calculation in each of four (first through fourth) quadrants obtained by subdividing a coordinate input surface, which is based upon X, Y coordinates.

In this example of the prior art, a set of sensors is decided in dependence upon the particular quadrant in which a point designated by a vibrating pen resides. On the basis of data obtained by sensors decided, the x and y coordinates are calculated using one set of sensors for the x coordinate and a different set of sensors for the y coordinate.

More specifically, in a case where an input is made in, say, the first quadrant, a sensor 6a is most susceptible to the effects of waves reflected at the boundary where the vibration suppressor is attached. Accordingly, coordinate calculation is performed based upon signals other than the signal from sensor 6a. For example, in this instance the x coordinate is calculated based upon output signals from sensors 6c, 6d and the y coordinate is calculated based upon output signals from sensors 6b, 6d. Next, when the point at which an input is made shifts to the second quadrant, sensor 6b is most susceptible to the effects of reflected waves. Therefore, the x coordinate is calculated using the same set of sensors at in the first quadrant but the y coordinate is now calculated using sensors 6a, 6c. When the point at which an input is made crosses a boundary between quadrants, there are cases where the amount of error contained in the coordinate values calculated on the basis of sensors 6a, 6c will differ from the amount of error contained in the coordinate values calculated on the basis of sensors 6b, 6d. This can result in steps between quadrants, as shown in FIG. 9.

Thus, in an arrangement in which vibration sensors are selected region by region in order to perform coordinate calculation, a discontinuity in coordinate output can occur at portions where one region changes to another, i.e., where there is a changeover in the set of sensors selected. The discontinuity is caused by a shift in constants, such as a shift in the speed of vibratory propagation with regard to data from the selected vibration sensors, or a shift in the positions of the sensors.

SUMMARY OF THE INVENTION

Accordingly, an object of the present invention is to provide a coordinate input apparatus and method through which accurate input of coordinates can be performed with little error over the entire coordinate input surface.

Another object of the present invention is to provide a highly accurate coordinate input apparatus and method, in which the apparatus has a simple and compact construction.

A further object of the present invention is to provide a highly accurate coordinate input apparatus and method in which, regardless of the region of the coordinate input surface to which vibration is applied, there is little error in coordinate calculation ascribable to reflection of the vibration.

Still another object of the present invention is to provide a highly accurate coordinate input apparatus and method in which vibration sensors used are changed over in dependence upon which region of the coordinate input surface vibration has been applied to, thereby reducing error and eliminating discontinuity of coordinates between regions to provide greater accuracy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DESCRIPTION OF THE PREFERRED EMBODIMENTS

[FIRST EMBODIMENT]

Figure 1:
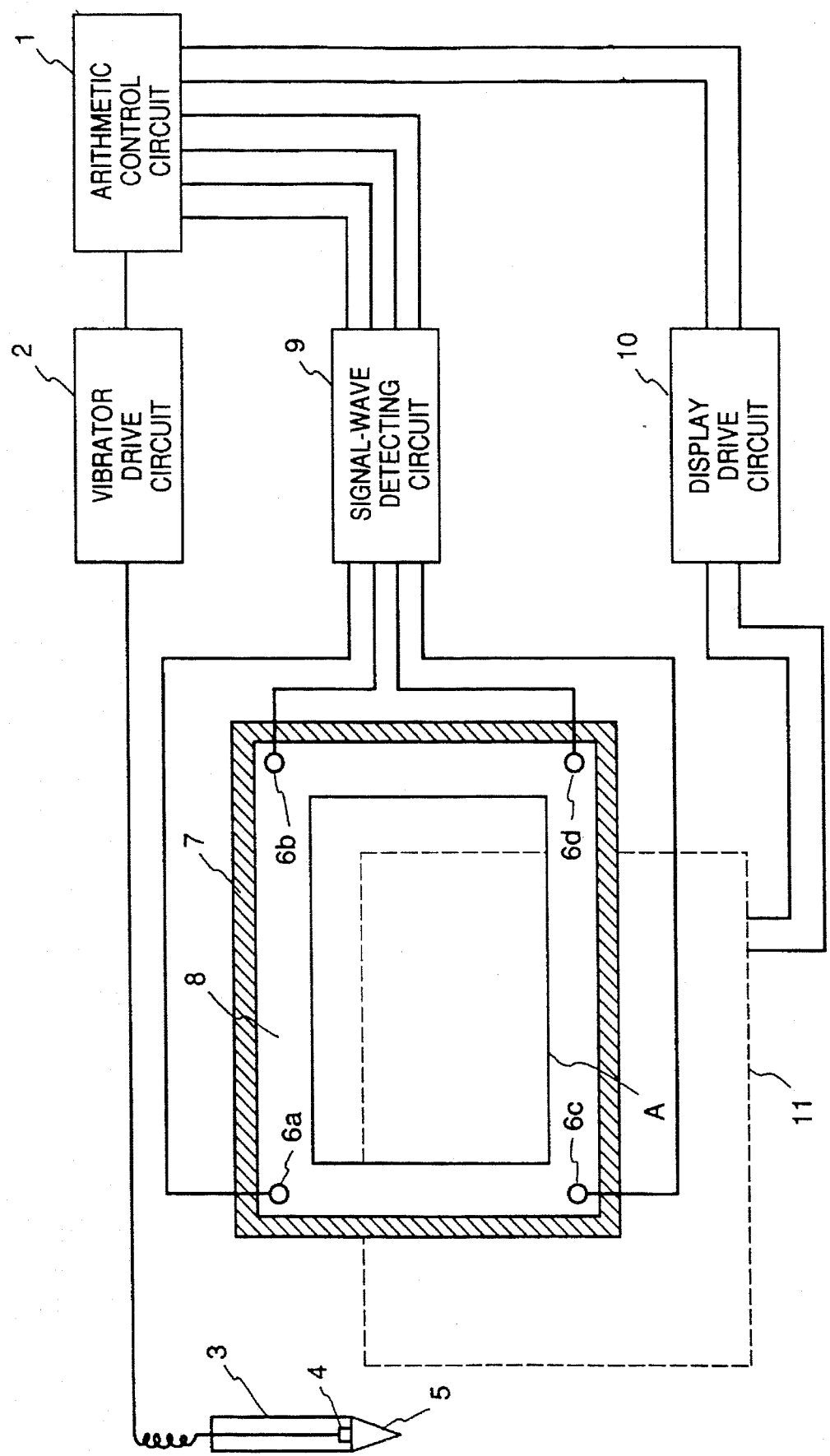
FIG. 1 is a block diagram illustrating the construction of a coordinate input apparatus.

FIG. 1 illustrates the structure of a coordinate input apparatus according to an embodiment of the present invention. As shown in FIG. 1, an arithmetic control circuit 1 controls the overall apparatus and calculates coordinates. An vibrator drive circuit 2 vibrates the tip 5 of a vibrating pen 3. A vibration transmitting tablet 8 comprises a transparent member consisting of an acrylic or glass plate. A coordinate input by the vibrating pen 3 is performed by bringing the vibrating pen 3 into contact with the vibration transmitting tablet 8. In actuality, the interior of an area (effective area) A, which is indicated by the solid line in FIG. 1, is designated by the operator using the vibrating pen 3. In order to prevent reflected vibration from returning to the central portion of the tablet (or in order to reduce such return), a vibration suppressor 7 is provided on the outer periphery of the vibration transmitting tablet 8. Vibration sensors 6a~6d, such as piezoelectric elements, for converting mechanical vibration into electrical signals are secured to the tablet at the boundary of the vibration suppressor 7.

A detecting circuit 9 outputs signals, which indicate that vibration has been sensed by each of the vibration sensors 6a~6d, to the arithmetic control circuit 1. A display 11 such as a liquid-crystal display device is capable of presenting a display in dot units and is disposed in back of the vibration transmitting tablet 8. The display 11 is driven by a display drive circuit 10 and displays dots at positions traced by the vibrating pen 3. The operator is capable of seeing the display 11 through the vibration transmitting tablet 8 comprising the transparent member.

An vibrator 4 housed within the vibrating pen 3 is driven by the vibrator drive circuit 2. The drive signal of the vibrator 4 is supplied from the arithmetic control circuit 1 as a low-level pulse signal. This signal is amplified at a prescribed gain by the vibrator drive circuit 2, after which the amplified signal is applied to the vibrator 4 The electrical drive signal is converted into mechanical ultrasonic vibration by the vibrator 4, and the mechanical vibration is transmitted to the vibration transmitting tablet 8 via the pen tip 5.

Figure 2:
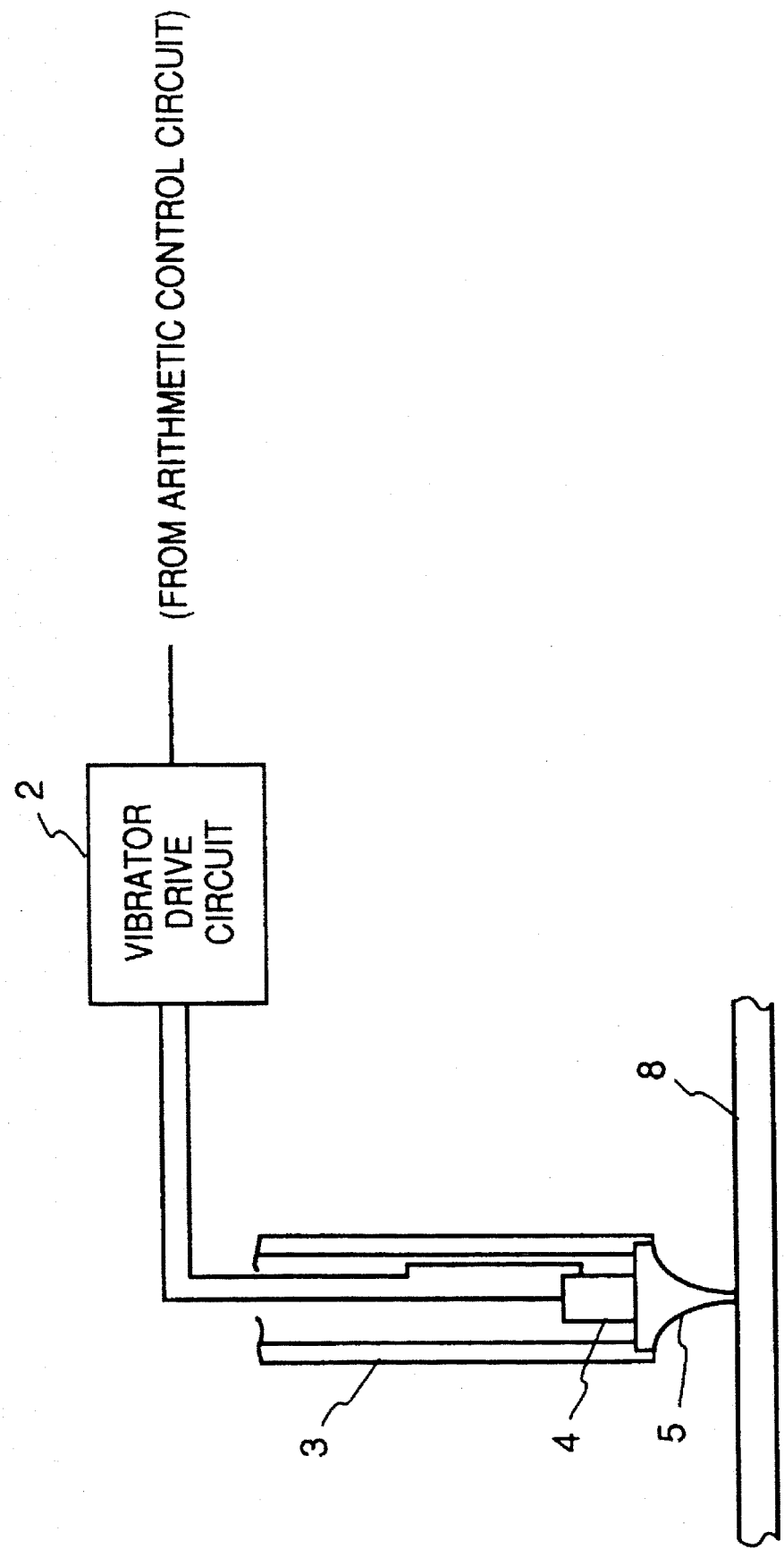
FIG. 2 is a diagram showing the construction of a vibrating pen.

The vibration frequency of the vibrator 4 is selected to have a value capable of generating Lamb waves in the vibration transmitting tablet 8, which consists of glass or the like. When the vibrator is driven, a mode in which the vibrator vibrates in the vertical direction in FIG. 2 with respect to the vibration transmitting tablet 8 is selected. Highly efficient conversion of vibration is possible by making the vibration frequency of the vibrator 4 equal to the resonance frequency of the pen tip 5.

As mentioned above, the elastic waves transmitted through the vibration transmitting tablet 8 are Lamb waves, which are advantageous in that they are less susceptible than surface waves or the like to the influence of scratches in the surface of the vibration transmitting tablet, obstacles and the like.

<Description of Arithmetic Control Circuit>

In the arrangement set forth above, the arithmetic control circuit 1 outputs a signal, which drives the vibrator 4 within the vibrating pen 3, at a prescribed period (e.g., every 5 ms). This signal is applied to the vibrator drive circuit 2. The arithmetic control circuit 1 also starts measurement of time by an internal timer (constituted by a counter). The vibration produced by the vibrating pen 3 arrives at the vibration sensors 6a~6d upon being delayed a period of time commensurate with distance from the vibration source.

The signal detecting circuit 9 detects the signal from each of the vibration sensors 6a~6d and, by waveform-detection processing described below, generates a signal indicative of the timing at which the vibration arrives at each vibration sensor. These signals from each of the sensors enter the arithmetic control circuit 1, which detects the transmission lag time from the vibrating pen 3 to each of the vibration sensors 6a~6d and calculates the coordinates of the position of the vibrating pen 3. Further, the arithmetic control circuit 1 drives the display drive circuit 10 on the basis of the calculated information indicative of the position of the vibration sensor 3, thereby controlling the display presented by the display 11. Alternatively, the arithmetic control circuit 1 outputs the coordinates to an external unit (not shown) by serial or parallel communication.

Figure 3:
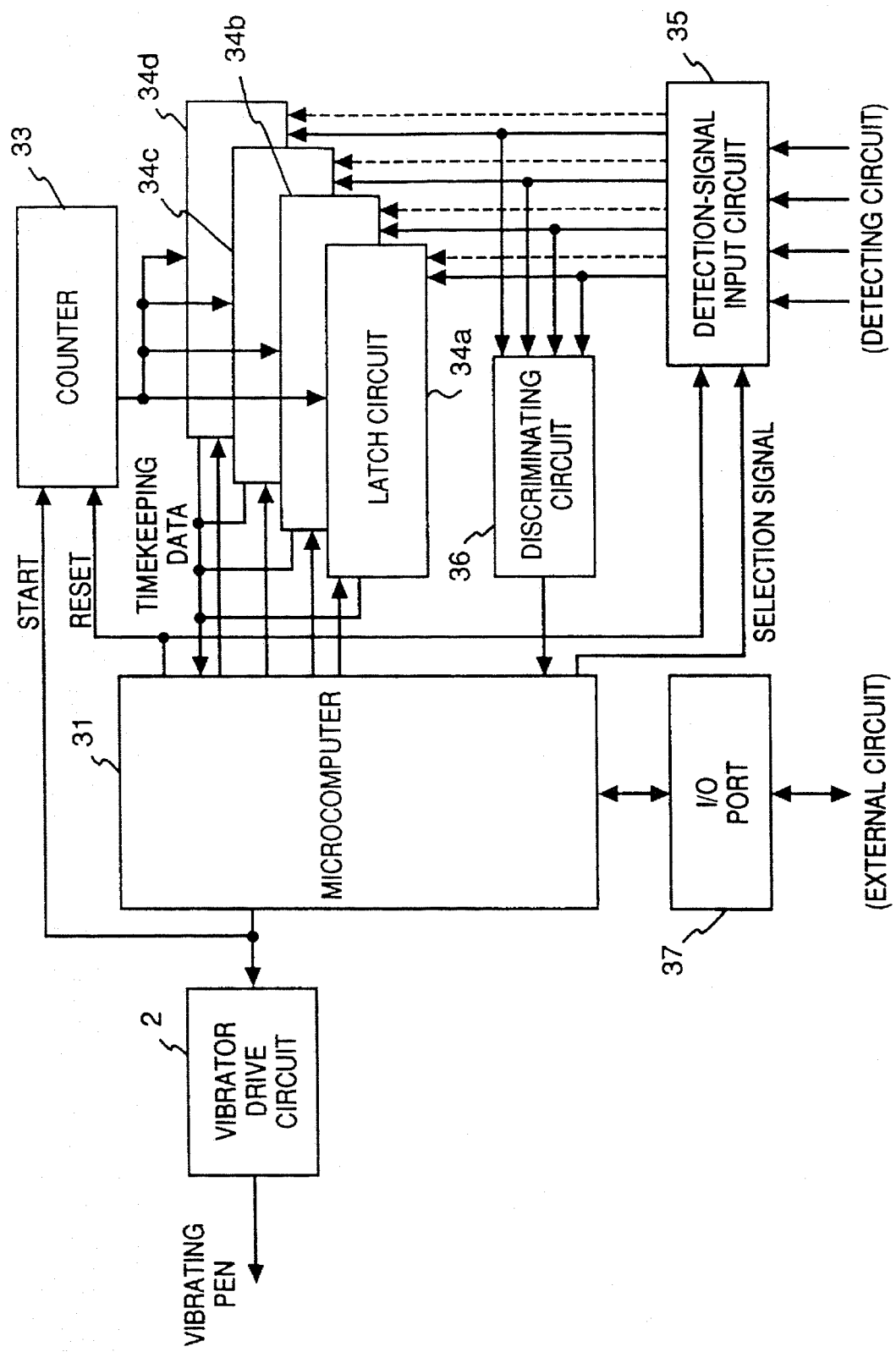
FIG. 3 is a diagram showing the internal construction of an arithmetic control circuit according to this embodiment.

FIG. 3 is a block diagram illustrating the general configuration of the arithmetic control circuit 1 according to this embodiment. The elements of this circuit and the operation thereof will now be described.

As shown in FIG. 3, a microcomputer 31 controls the arithmetic control circuit 1 and the overall coordinate input apparatus. The microcomputer 31 is constituted by an internal counter, a ROM storing the operating procedure, a RAM used in calculations and a non-volatile memory for storing constants and the like.

A timer 33, which is constituted by a counter, for example, and counts a reference clock (not shown). When the start signal for starting the drive of the vibrator 4 within the vibrating pen 3 enters the vibrator drive circuit 2, the timer 33 starts measuring time. As a result, synchronization is established between the start of time measurement and detection of vibration by the sensors, and lag time until detection of vibration by the vibration sensors 6a~6d is capable of being measured.

Other circuits constructing the apparatus will be described in due course.

Vibration-arrival timing signals from the respective vibration sensors 6a~6d outputted by the signal detecting circuit 9 enter respective latches 34a~34d via a detection-signal input port 35.

The latch circuits 34a~34d correspond to the vibration sensors 6a~6d, respectively. When the timing signal from the corresponding sensor is received, the currently prevailing value of time measured by the timer 33 is latched by the particular latch circuit. When a discriminating circuit 36 determines that all of the detection signals have thus been received, the circuit 36 outputs a signal to this effect to the microcomputer 31.

Upon receiving the signal from the discriminating circuit 36, the microcomputer 31 reads the vibration lag times from the vibrating pen to each of the vibration sensors out of the corresponding latch circuits 34a~34d and performs a predetermined calculation so as to calculate the positional coordinates of the vibrating pen 3 on the vibration transmitting tablet 8. The calculated coordinate information is outputted to the display drive circuit 10 via an I/O port 37, thereby making it possible to display dots or the like at the corresponding position of the display 11. Alternatively, the coordinate information is outputted to an interface circuit via the I/O circuit 37, whereby the coordinate values can be outputted to an external device.

<Description of Detection of Vibration Propagation Time (FIGS. 4, 5)>

Described next is the principle for calculating the lag time necessary for arrival of vibration at the vibration sensor 6.

Figure 4:
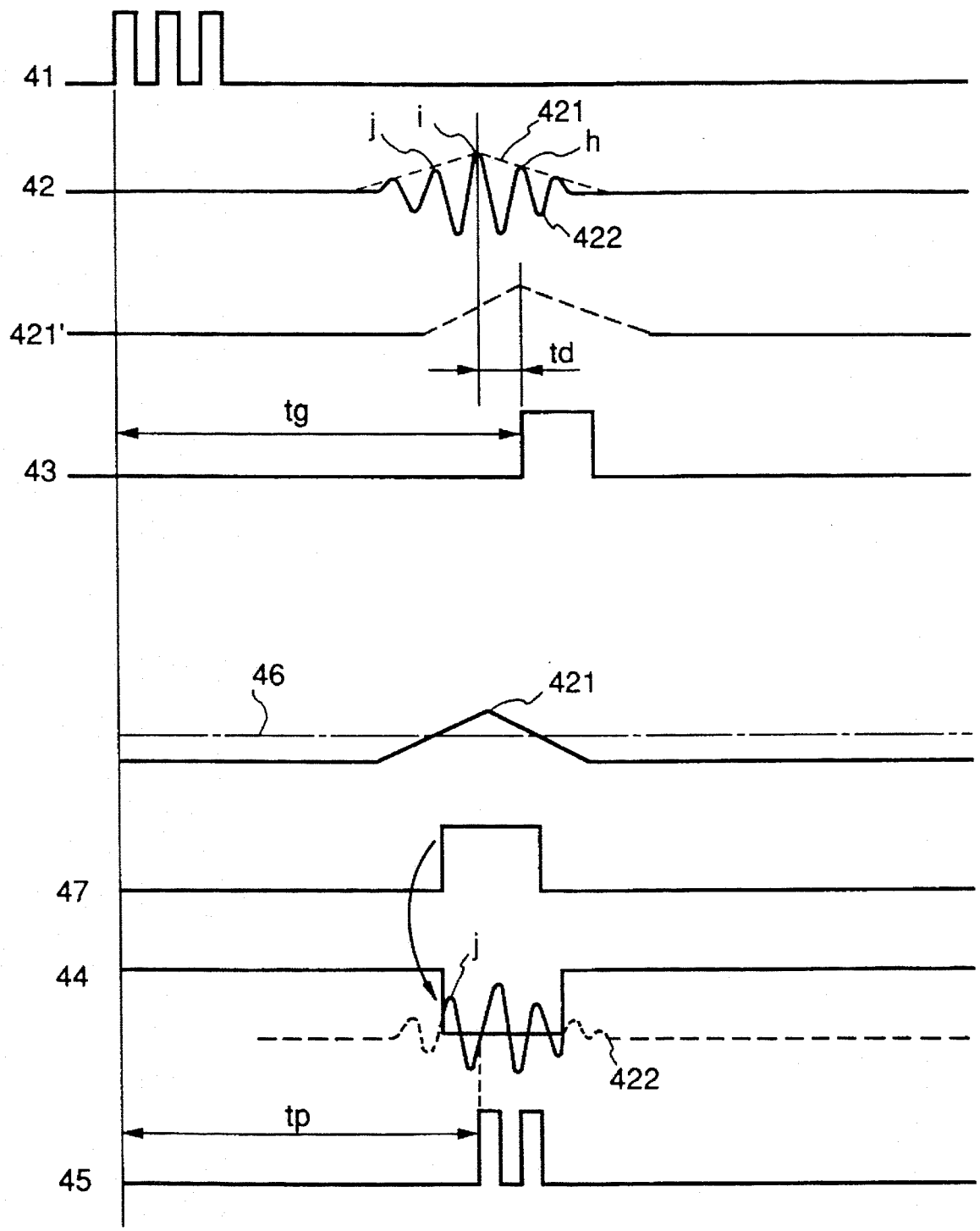
FIG. 4 is a time chart of signal processing.

FIG. 4 is a diagram for describing detection waveforms that enter the signal detecting circuit 9 as well as the processing for measuring lag time based upon these waveforms. Though the description relates solely to the vibration sensor 6a, operation is exactly the same with regard to the other vibration sensors 6b, 6c and 6d as well.

The measurement of lag time for transmission of vibration to the vibration sensor 6a starts at the same time that the start signal is outputted to the vibrator drive circuit 2, as already described. At this time a drive signal 41 from the vibrator drive circuit 2 is applied to the vibrator 4. Ultrasonic vibration transmitted from the vibrating pen 3 to the vibration transmitting tablet 8 by the signal 41 advances in a period of time tg commensurate with the distance to the vibration sensor 6a, after which the vibration is sensed by the sensor 6a. Signal 42 in FIG. 4 indicates the signal waveform sensed by the vibration sensor 6a.

Since the vibration used in this embodiment is a Lamb wave, the relationship between the envelope 421 of detection waveform 42 and phase 422 with respect to propagation distance within the vibration transmitting tablet 8 varies in dependence upon the transmission distance during transmission of vibration. Let Vg represent the speed at which the envelope 421 advances, namely the group velocity, and let Vp represent the phase velocity of the phase 422. The distance between the vibrating pen 3 and the vibration sensor 6a can be detected from the group velocity Vg and phase velocity Vp.

First, attention is directed solely to the envelope 421, the velocity of which is Vg. When a point on a certain specific waveform, e.g., an inflection point or a peak is detected, as in the manner of a signal indicated at 43 in FIG. 4, the distance between the vibrating pen 3 and the vibration sensor 6a is given by the following equation, in which the vibration lag time is represented by tg:

$$d = Vg \cdot tg \quad (1)$$

Though this equation relates to the vibration sensor 6a, the distances between the other three vibration sensors 6b~6d and the vibrating pen 3 can be similarly expressed by the same equation.

Furthermore, processing based upon detection of the phase signal is executed in order to decide the coordinates more accurately.

Let tp (waveform 45) represent the time from a specific detection point of the phase waveform signal 422, e.g., the time from application of vibration to a zero-cross point after a predetermined signal level 46 (tp) is obtained by producing a window signal 44 of a prescribed width with respect to a signal 47, and comparing the signal 44 with the phase signal 422). The distance between the vibration sensor and the vibrating pen is given by the following equation:

$$d = n \cdot \lambda p + Vp \cdot tp \quad (2)$$

where λp represents the wavelength of the elastic wave and n is an integer.

The integer n may be expressed as follows from Equations (1) and (2):

$$n = [(Vg \cdot tg - Vp \cdot tp)/\lambda p + 1/N] \quad (3)$$

It should be noted that N is a real number other than "0". Any appropriate value may be used. For example, if N=2 holds, n can be decided when there is fluctuation of tg or the like within ±½ wavelength. By substituting n thus obtained into Equation (2), the distance between the vibrating pen 3 and vibration sensor 6a can be measured with greater accuracy. In order to measure these two lag times tg and tp, signals 43 and 45 are produced by the signal detecting circuit 9. The signal detecting circuit 9 is constructed as shown in FIG. 5.

Figure 5:
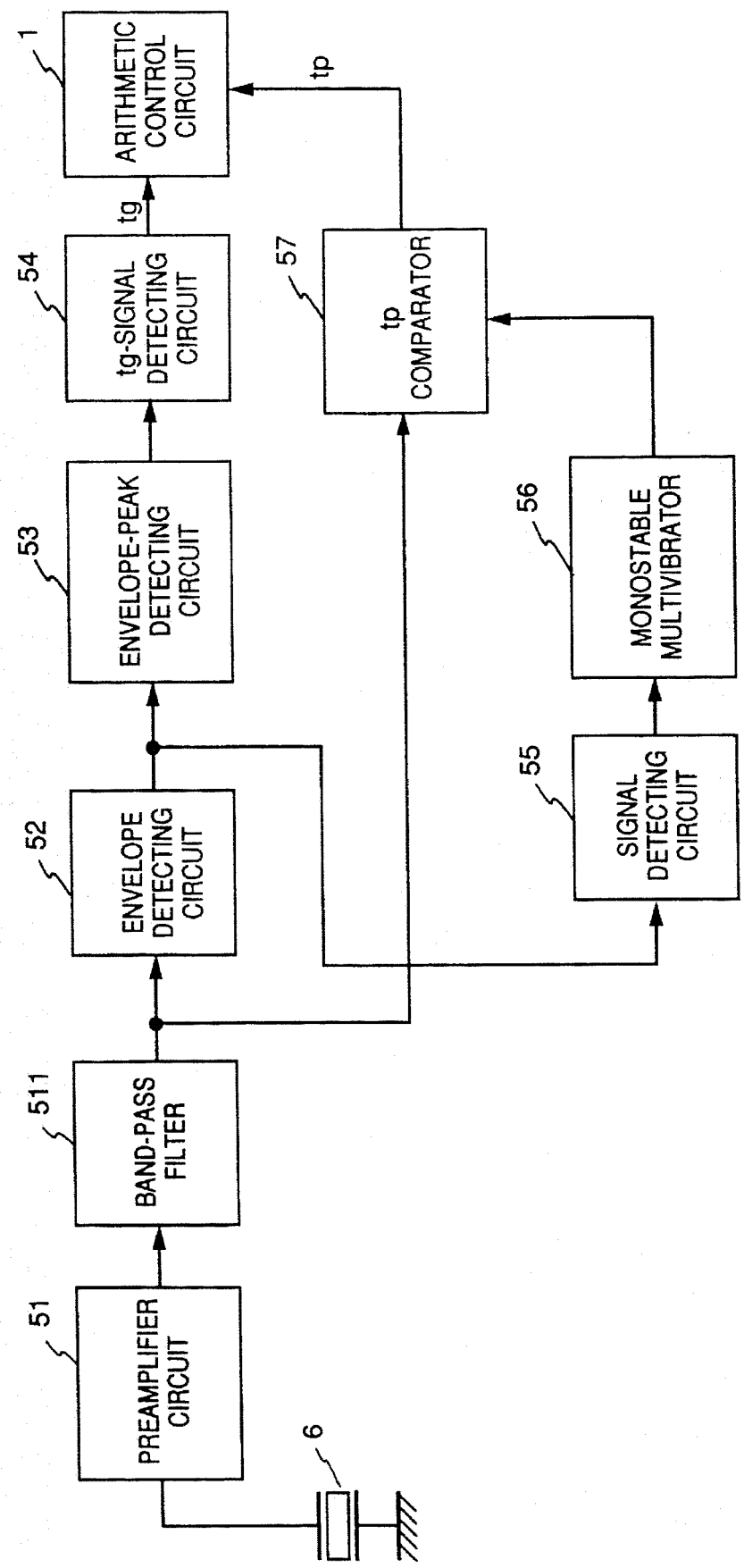
FIG. 5 is a block diagram of a signal detecting circuit.

FIG. 5 is a block diagram illustrating the arrangement of the signal detecting circuit 9 according to this embodiment. In FIG. 5, the output signal of the vibration sensor 6 is amplified to a prescribed level by a preamplifier circuit 51. The amplified signal is applied to a band-pass filter 511, which removes unnecessary frequency components from the detection signal. The filtered signal enters an envelope detecting circuit 52, which is composed of an absolute-value circuit and a low-pass filter, etc., whereby only the envelope of the detection signal is extracted. The timing of the envelope peak is detected by an envelope-peak detecting circuit 53. The output of the envelope-peak detecting circuit 53 enters a tg signal detecting circuit 54. On the basis of the peak timing detected by the peak detecting circuit 53, the tg signal detecting circuit 54 comprising a monostable multivibrator and the like produces the signal tg (signal 43 in FIG. 4), which indicates the lag time of the envelope of the prescribed waveform. The signal tg is applied to the arithmetic control circuit 1.

A signal detecting circuit 55 produces the pulse signal 47 for a portion where the envelope signal 421 detected by the envelope detecting circuit 52 exceeds the threshold-value signal 46 of the prescribed level. A monostable multivibrator 56 outputs the gate signal 44 of a prescribed duration triggered by the first leading edge of the pulse signal 47. A tp comparator 57 detects the zero-cross point of the first leading edge of the phase signal 422 while the gate signal 44 is open, and the signal tp indicative of the lag time of the phase is supplied to the arithmetic control circuit 1 as a result. It should be noted that the above-described circuit is for the vibration sensor 6a, and that identical circuits are provided for the other vibration sensors as well.

<Description of Correction of Circuit Time-Delay Correction>

The time delays latched by the latch circuits 34a~34d include a circuit time delay et and a phase offset time toff. An error attributable to et and toff is always contained in the same amount when vibration is transmitted from the vibration pen 3 to the vibration transmission tablet 8 and vibration sensors 6a~6d.

Figure 6:
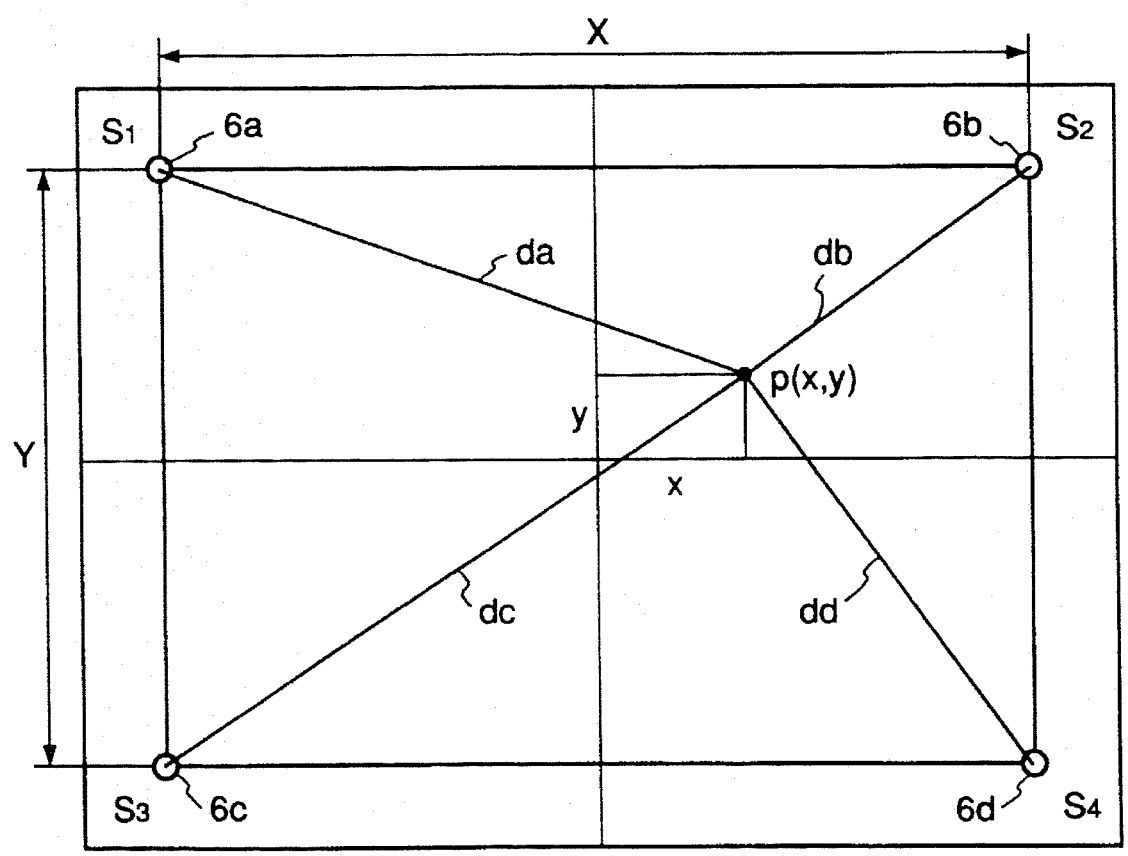
FIG. 6 is a diagram showing the coordinate system of a coordinate input apparatus.

Accordingly, in FIG. 6, let R1 represent the distance from the position of the origin O to the vibration sensor 6a, let tgz', tpz' represent actually measured lag times of vibration from the origin O to the sensor 6a as actually measured by making an input at the origin O using the vibration pen 3, and let tgz, tpz represent true lag times of vibration from the origin O to the sensor 6a. These are related as follows with regard to circuit delay time et and phase offset toff:

$$tgz'=tgz+et \quad (4)$$

$$tpz'=tpz+et+toff \quad (5)$$

Similarly, actually measured values tg', tp' at an arbitrary input point P are as follows:

$$tg'=tg+et \quad (6)$$

$$tp'=tp+et+toff \quad (7)$$

The difference between Equations (4) and (6) and between Equations (5) and (7) are as follows:

$$tg'-tgz'=(tg+et)-(tgz+et)=tg-tgz \quad (8)$$

$$tp'-tpz'=(tp'+et+toff)-(tpz+et+toff)=tp-tpz \quad (9)$$

In Equations (8) and (9), the circuit time delay et and phase offset toff contained in each of the transmission times have been eliminated from the equations. As a consequence, the difference between true transmission lag times commensurate with the distances from the position of the origin O, which starts from the position of the sensor 6a, to the input point P can be obtained and the difference between the distances can be found using Equations (2) and (3).

The distance from the vibration sensor 6a to the origin O is stored in a non-volatile memory or the like beforehand and therefore is known. This means that the difference between the vibrating pen 3 and vibration sensor 6a can be determined. The distances with regard to the other sensors 6b~6d can also be found in a similar manner.

The actually measured values tgz' and tpz' at the origin O are stored in the non-volatile memory at the time of shipping, and Equations (8), (9) are executed prior to the calculation of Equations (2), (3) so that highly precise measurement can be performed.

<Description of Coordinate Calculation (FIG. 6)>

The principle through which coordinates are actually detected on the vibration transmitting tablet 8 by the vibrating pen 3 will now be described.

The four vibration sensors 6a~6d are provided at positions S1~S4, respectively, located at the corners of the vibration transmitting tablet 8. When this is done, the straight-line distances da~dd from the position P of the vibrating pen 3 to the positions of the vibration sensors 6a~6d, respectively, can be obtained on the basis of the principle described above. On the basis of these straight-line distances da~dd, the arithmetic control circuit 1 is capable of obtaining coordinates (x,y) of the position P of the vibrating pen 3 in the following manner using the Pythagorean theorem:

$$x[a,b]=(da+db)\cdot(da-db)/2X \quad (10\text{-a})$$

$$x[c,d]=(dc+dd)\cdot(dc-dd)/2X \quad (10\text{-b})$$

$$y[a,c]=(da+dc)\cdot(da-dc)/2Y \quad (11\text{-a})$$

$$y[b,d]=(db+dd)\cdot(db-dd)/2Y \quad (11\text{-b})$$

where X represents the distances between the vibration sensors 6a, 6b and 6c, 6d, and Y represents the distances between the vibration sensors 6a, 6c and 6b, 6d. In the above expressions, the indices [*, #] of x y indicate that the sensors used in calculation are a sensor 6* and a sensor 6#.

When the vibration pen is in the first quadrant, the sensor most susceptible to the effects of reflection is the sensor 6a. Accordingly, the equations used in coordinate calculation are Equation (10-b) for calculation of x[c,d] and Equation (11-b) for calculation of y [b,d].

In the second quadrant, sensor 6b is most susceptible to the effects of reflection and therefore x[c,d] is calculated using Equation (10-a) and y[a,c] is calculated using Equation (11-a).

Figure 7:
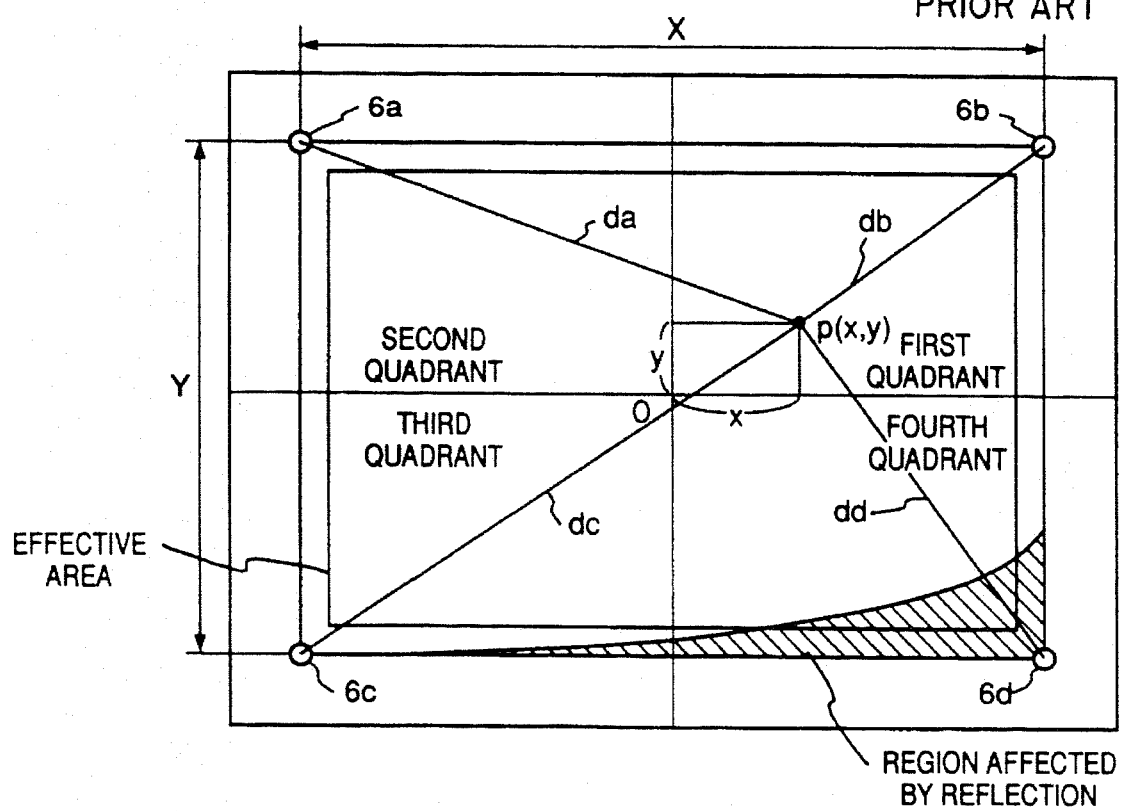
FIG. 7 is a diagram showing the relationship between quadrants and an error region.

FIG. 7 is a diagram illustrating a region in which the sensor 6c is influenced by reflected waves. As shown in FIG. 7, the area in which sensor 6c is influenced by waves reflected at the end face of the tablet is located in the corner of the fourth quadrant, as indicated by the shaded portion. The greater the distance, the stronger the influence of reflected waves (the same is true for the other sensors). Thus, the greater the distance from the sensor, the greater the percentage of error. Accordingly, by weighting the y coordinate y[b,d] of the first quadrant and the y coordinate y[a,c] of the second quadrant calculated by the aforesaid coordinate calculation formulae and then obtaining the mean value, the step between quadrants can be reduced.

When the entered coordinates are shifted from the first quadrant to the second quadrant, the calculation formula relating to the x axis employs Equation (10-b) for x[c,d], which uses the sensors 6c, 6d, in both regions so that a step between quadrants is not produced. In other words, on the basis of this value, it is possible to reduce the step between quadrants by calculating the mean of coordinate values calculated from the two equations (11-a) for y[a,c] and (11-b) for y[b,d] relating to the y axis. That is, in a case where the center is adopted as the origin, as shown in FIG. 7, it will suffice to perform coordinate calculation as follows using the coordinate outputs in each of the first and second quadrants:

$$x=x[c,d] \quad (10\text{-b})$$

$$y=\{y[a,c]*(1-(X/2+x[c,d])/X)+y[b,d]*((X/2+x[c,d])/X)\}/2 \quad (12)$$

In accordance with Equation (12), the value of the y coordinate is obtained by multiplying the y coordinate y[a,c] in the second quadrant by the weight (1−(X/2+x[c,d] )/X), multiplying the y coordinate y[b,d] in the first quadrant by the weight ((X/2+x[c,d])/X) and then taking the mean of these two values. The weight ((X/2+x[c,d])/X) signifies what percentage of the width X of the first and second quadrants along the x axis is occupied by the distance from sensor 6a (i.e., x=−X/2) to x[c,d] along the x axis, and the weight (1−(X/2+x[c,d])/X) signifies what percentage of the width X is occupied by the distance from sensor 6b (i.e., x=X/2) to x[c,d] along the x axis. In other words, the closer the input coordinates are to a corner, the greater the susceptibility to the influence of reflected waves, as depicted in FIG. 7. Therefore, coordinates are calculated upon reducing the weight for coordinate values obtained using sensors readily susceptible to the influence of reflected waves.

In the foregoing, the description is rendered solely with regard to the y coordinate between the first and second quadrants. However, the foregoing description may be applied similarly between other quadrants as well.

Figure 8:
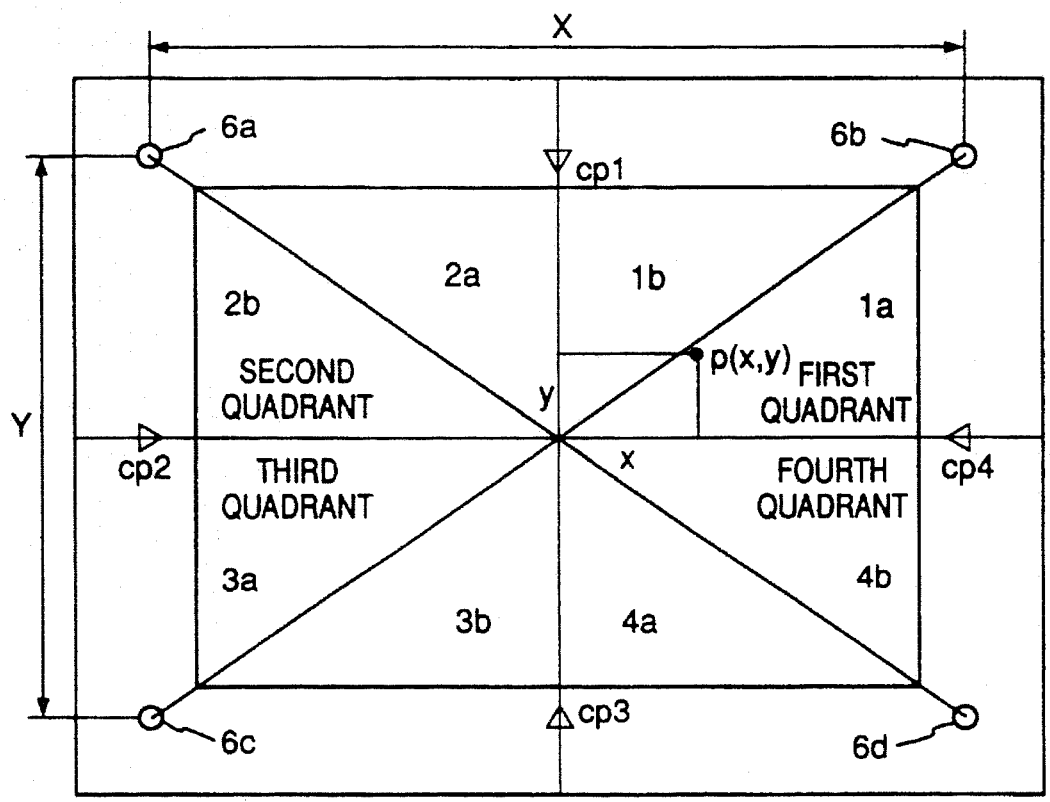
FIG. 8 is a diagram for describing quadrants in which calculation is performed.
Figure 9:
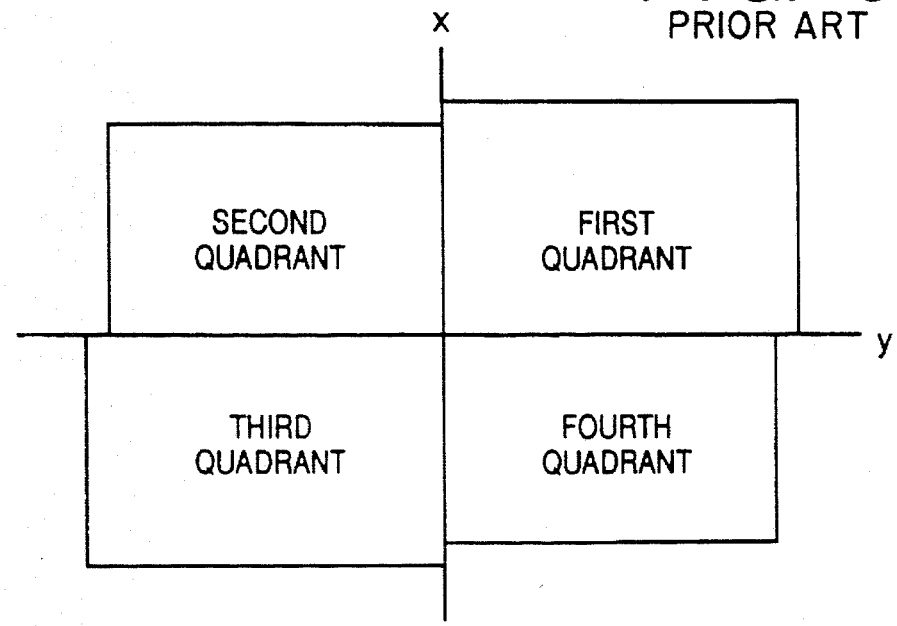
FIG. 9 is a diagram for describing steps between quadrants in an example of the prior art.

For example, with regard to movement from the first to the fourth quadrant, there is the possibility that a step of the aforementioned kind will develop regarding the x coordinate. In order to diminish the step over the entirety of the input area, it will suffice to take the weighted mean with regard to both the x and y coordinates. As for weighting in each quadrant, it is necessary to change the axis along which the mean is taken with respect to movement from, say, the first to the second quadrant and from the first to the fourth quadrant in the region in which the input was made. In such case, it is required that each region be further subdivided in order to select a stable coordinate axis. Error attributable to reflection or the like increases as the peripheral portion of the input area is approached. Accordingly, the region is further subdivided on lines connecting the sensors 6b–6c and sensors 6a–6d so that each quadrant is subdivided into portions a and b, as illustrated in FIG. 8. In region 1a, the y coordinate is calculated by y[b,d] (eq. 11-b) and the x coordinates is obtained by calculating the weighted average of x[a,b] (eq. 10-a) and x[c,d] (eq. 10-b) in accordance with the distance from the sensors. In region 1b, if the x coordinate is calculated by x[c,d] (eq. 10-b) and the y coordinate is calculated by equation (12), the step can be reduced in similar fashion. The rate of weighting in the calculation formula will be decided so as to enlarge the ratio of the coordinate data output from a sensor that is little affected by reflection. In other words, the coordinate calculation formulae are as follows:

$$x=\{y[p1]*(1-(Y/2+y[p2])/Y)+x[p3]*((Y/2+y[p2])/Y)\}/2 \quad (13)$$

$$y=\{y[p4]*(1-(X/2+x[p5])/X)+y[p6]*((X/2+x[p5])/X)\}/2 \quad (14)$$

A combination of sensors p1~p6 in the foregoing equations are as shown in the following table with regard to each of the eight regions depicted in FIG. 8.

In regions 1b, 2a, 3b, 4a where there is no change in the combination of sensors, it will suffice to calculate the x coordinate using (13'), (13") in Table 1. In regions 1a, 2b, 3a, 4b, it will suffice to calculate the y coordinate using (14'), (14").

TABLE 1

| Quadrant | region | X coordinate (eg. 13) | | | Y coordinate (eg. 14) | | |
| --- | --- | --- | --- | --- | --- | --- | --- |
| | | p1 | p2 | p3 | p4 | p5 | p6 |
| 1st | 1a | c,d | b,d | a,b | y = y[b,d] ... (14') | | |

TABLE 1-continued

| Quadrant | region | X coordinate (eg. 13) | | | Y coordinate (eg. 14) | | |
| --- | --- | --- | --- | --- | --- | --- | --- |
| | | p1 | p2 | p3 | p4 | p5 | p6 |
| | 1b | x = x[c,d] ... (13') | | | a,c | c,d | b,d |
| 2nd | 2a | | | | | | |
| | 2b | c,d | a,c | a,b | y = y[a,c] ... (14") | | |
| 3rd | 3a | | | | | | |
| | 3b | x = x[a,b] ... (13") | | | a,c | a,b | b,d |
| 4th | 4a | | | | | | |
| | 4b | c,d | b,d | a,b | y = y[b,d] ... (14') | | |

Figure 10:
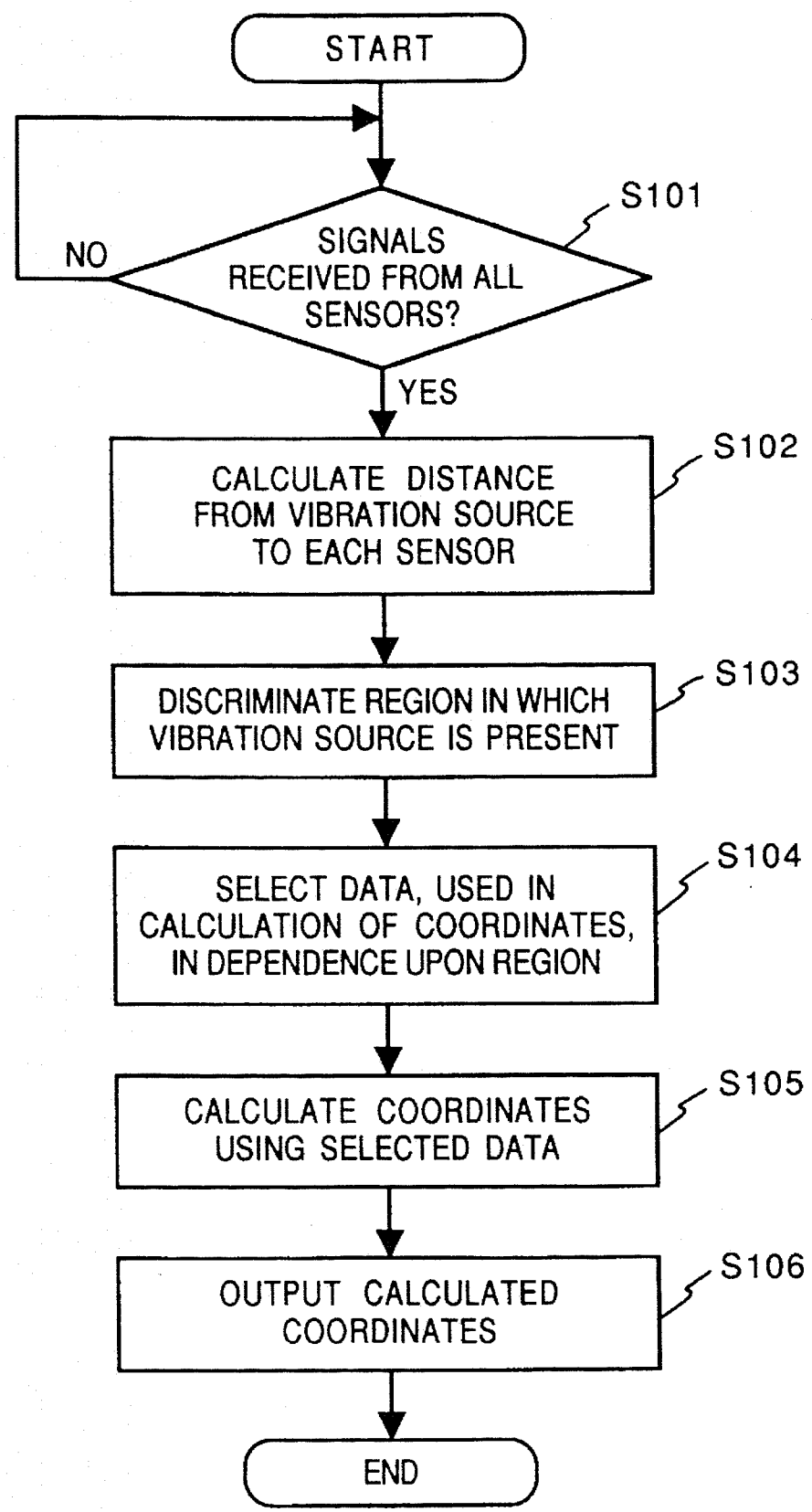
FIG. 10 is a flowchart of processing for calculating and outputting coordinates according to the first embodiment.

FIG. 10 is a flowchart showing the process for calculating the coordinate (x, y) of the vibration transmitting tablet in this embodiment.

Thus, as described above, the invention provides a highly precise coordinate input apparatus in which a coordinate input surface is divided into regions and coordinate values are calculated region by region. By using coordinate values which is calculated based on only two sensors shown by expression (10-a)~(11-b), the weighted mean is taken of coordinate values for which the occurrence of steps between regions is possible. As a result, it is possible to prevent a decline in precision and resolution ascribable to a step at a point where there is a changeover from one region to the next region. Furthermore, each region has a predetermined correction coefficient, and a coordinate output is corrected by a coefficient specific to each region. This makes it possible to reduce error as caused by a step between regions.

[ SECOND EMBODIMENT ]

In the first embodiment described above, the ratio of sensors used with respect to the entire region of the coordinate input surface is changed. However, in a region in which error at the peripheral portion of the effective area increases, as mentioned earlier, the weighting ratio is changed in such a manner that the coordinates sought are not handled as mean values. As a result, coordinates can be calculated more accurately. For example, if only one coordinate value is adopted at a location which is ⅔ of each region, Equations (13), (14) are modified as follows:

$$x=\{x[p1]*int(1-(Y/2+y[p2])/(2Y/3))+x[p3]*int((Y/2+y[p2])/(2Y/3))\}/2 \quad (15)$$

$$y=\{y[p4]*int(1-(X/2+x[p5])/(2X/3))+y[p6]*int((X/2+x[p5])/(2X/3))\}/2 \quad (16)$$

If coordinates are calculated in accordance with these equations, precision can be improved without using coordinate values at portions where error is large.

Further, in the first embodiment, the one component of coordinate is obtained by calculating weighted average using another component of coordinate, as a result of which steps can be reduced. However, accuracy can be improved and steps reduced by outputting coordinate values upon correcting them using correction coefficients in respective ones of the quadrants (1~4) subdivided for the purpose of coordinate calculation.

In an arrangement of the kind shown in FIG. 8, steps easily occur at points cp1~cp4 in FIG. 8. Accordingly, the ratio of coordinates of each point cp to coordinates calculated by each combination of sensors is calculated in advance and stored in a non-volatile memory at the time of shipping, adjustment, etc.

Let Xcp1, Ycp1 represent the coordinate values at the point cp1. Correction coefficients wbd1, Kac1 for y[b,d]

(first quadrant) and the y coordinate y[a,c] (second quadrant), respectively, calculated at this point are stored as Kbd1=Ycp1/y[b,d], Kac1=Ycp1/y[a,c]

By using these coefficients, coordinates of each quadrant are calculated as y=Kbd1*y[b,d] (first quadrant)

y=Kac1*y[a,c] (second quadrant)

This makes it possible to reduce steps at locations where there is changeover in the sensor combination.

The same operation is performed at other cp points as well. For example, in the first quadrant, the aforementioned Kbd1 is used with regard to the y coordinate. With regard to the x coordinate, Kcd4 is similarly calculated from the coordinate Xcp4 of point cp4 and the x coordinate x[c,d], and this is stored. When calculation is performed in the first quadrant, it will suffice to perform this coordinate calculation using this value at all times. By performing the same operation for all quadrants, it is possible to reduce steps caused by a changeover in sensor group over the entire region of the input area. Moreover, accuracy is improved.

The present invention can be applied to a system constituted by a plurality of devices or to an apparatus comprising a single device. Furthermore, it goes without saying that the invention is applicable also to a case where the object of the invention is attained by supplying a program to a system or apparatus.

The coordinate input apparatus according to the present invention is advantageous in that it is possible to enter coordinates accurately with little error over the entire coordinate input surface.

The present invention is not limited to the above embodiments and various changes and modifications can be made within the spirit and scope of the present invention. Therefore, to apprise the public of the scope of the present invention, the following claims are made.

What is claimed is:

1. A coordinate input apparatus comprising:

input means for entering a vibration;

a vibration transmitting tablet for transmitting the vibration entered by said input means;

sensing means for sensing, by a plurality of vibration sensors, the vibration which propagates through said vibration transmitting tablet;

distance calculating means for measuring a time delay from moment of entry of the vibration sensed by said sensing means and calculating distance between a vibration source and each of said plurality of vibration sensors based upon the time delay;

discriminating means for discriminating a region, in which the vibration has been entered, based upon the distance; and coordinate calculating means for calculating coordinates of the vibration source in dependence upon the region discriminated by said discriminating means and distances from the vibration sensors to the vibration source;

said coordinate calculating means calculating the value of a first component of coordinates based upon distances from two vibration sensors to the vibration source, and calculating the value of a second component of the coordinates by computing a mean value of a plurality of coordinate values, which have been calculated in correspondence with mutually different sets of vibration sensors, using the calculated value of said first component of coordinates as weighting, and adopting the mean value as the value of said second component of the coordinates.

2. The apparatus according to claim 1, wherein four of said plurality of vibration sensors are placed so as to define four corners of a rectangle; said discriminating means discriminates in which of four regions the vibration source is present, said four regions being obtained by dividing the rectangle by two perpendicularly intersecting straight lines with the approximate center of the rectangle serving as a coordinate-system origin; and said coordinate calculating means calculates the value of the first component of the coordinates based upon distances from two vibration sensors, which are decided in dependence upon said region, to the vibration source.

3. The apparatus according to claim 1, wherein four of said plurality of vibration sensors are placed so as to define four corners of a rectangle; said discriminating means discriminates in which of eight regions the vibration source is present, said eight regions being obtained by dividing the rectangle by two straight lines, which lie parallel to sides of the rectangle and pass through the vicinity of the mid-point of two mutually adjacent vibration sensors, and two straight lines passing through two opposing vibration sensors; and said coordinate calculating means calculates the value of the first component of the coordinates based upon distances from two vibration sensors, which are decided in dependence upon said region, to the vibration source.

4. A coordinate input method comprising:

an input step of entering a vibration in a vibration transmitting body;

a sensing step of sensing, by a plurality of vibration sensors, the vibration which propagates through said vibration transmitting body;

a distance calculating step of measuring a time delay from moment of entry of the vibration sensed at said sensing step and calculating distance between a vibration source and each of said plurality of vibration sensors based upon the time delay;

a discriminating step of discriminating a region, in which the vibration has been entered, based upon the distance; and a coordinate calculating step of calculating coordinates of the vibration source in dependence upon the region discriminated at said discriminating step and distances from the plurality of vibration sensors to the vibration source;

said coordinate calculating step calculating the value of a first component of coordinates based upon distances from two vibration sensors to the vibration source, and calculating the value of a second component of the coordinates by computing a mean value of a plurality of coordinate values, which have been calculated in correspondence with mutually different sets of vibration sensors, using the calculated value of said first component of coordinates as weighting, and adopting the mean value as the value of said second component of the coordinates.

5. The method according to claim 4, wherein four of said plurality of vibration sensors are placed so as to define four corners of a rectangle; said discriminating step discriminates in which of four regions the vibration source is present, said four regions being obtained by dividing the rectangle by two perpendicularly intersecting straight lines with the approximate center of the rectangle serving as a coordinate-system origin; and said coordinate calculating step calculates the value of the first component of the coordinates based upon distances from two vibration sensors, which are decided in dependence upon said region, to the vibration source.

6. The method according to claim 4, wherein four of said plurality of vibration sensors are placed so as to define four corners of a rectangle, said discriminating step discriminates in which of eight regions the vibration source is present, said eight regions being obtained by dividing the rectangle by two straight lines, which lie parallel to sides of the rectangle and pass through the vicinity of the mid-point of two mutually adjacent vibration sensors, and two straight lines passing through two opposing vibration sensors; and said coordinate calculating step calculates the value of the first component of the coordinates based upon distances from two vibration sensors, which are decided in dependence upon said region, to the vibration source.

* * * * *